United States Patent Office 3,177,912
Patented Apr. 13, 1965

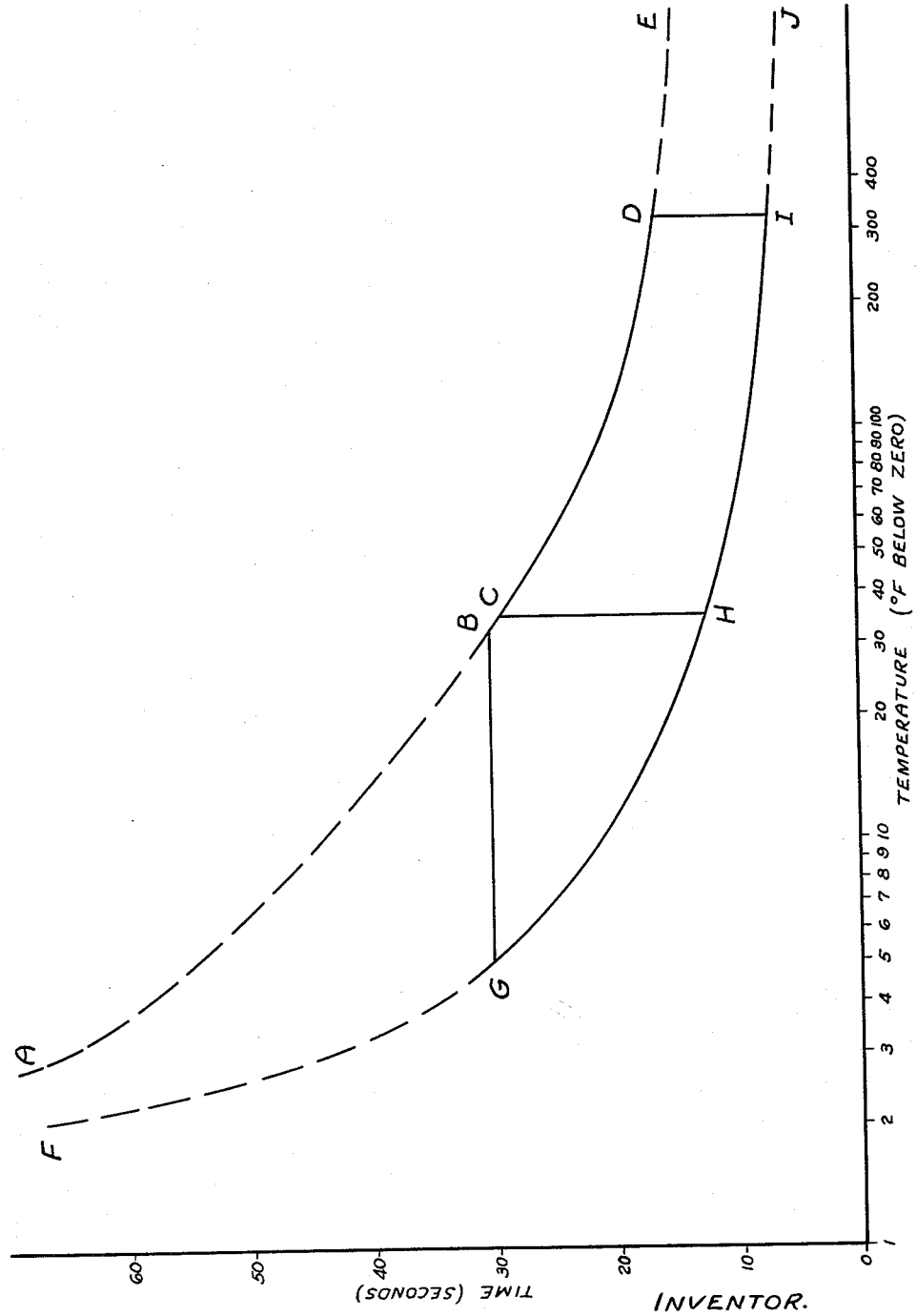

3,177,912
PEAR PEELING PROCESS
Belmont L. Haller, Long Beach, Calif., assignor to Hunt Foods and Industries, Inc., Fullerton, Calif., a corporation of California
Filed June 11, 1962, Ser. No. 201,416
8 Claims. (Cl. 146—228)

The present invention relates in general to a pear peeling process and, more particularly, to a method of peeling pears which involves conditioning the pears for mechanical peeling by means of a freezing treatment.

The basic object of the invention is to provide a method of conditioning a pear for peeling which permits clean separation of substantially only the epidermal layer of the pear by mechanical action without the loss of any of the cortex parenchyma, or main fleshly portion, of the pear. Thus, maximum yield is achieved, which is an important feature of the invention.

I have found that by freezing substantially only the epidermal layer of the pear, and then restoring the pear to room temperature, i.e., a temperature of the order of 60° F. to 80° F., the epidermal layer may readily be separated from the cortex parenchyma of the pear within the hypodermal layer thereof, thereby retaining all, or substantially all, of the cortex parenchyma. A fundamental object of the invention is to provide a freeze conditioning treatment of this nature.

To achieve maximum yield, it is essential that the freezing depth be restricted to a value not exceeeding, or not substantially exceeding, the thickness of the epidermal layer of the pear. With normal pears within the ripeness range suitable for commercial canning operations, the thickness of the epidermal layer is of the order of 0.01 inch. The invention contemplates freezing the pear only to a depth of this order of magnitude in order to insure clean separation of the epidermal layer while obtaining a maximum yield.

When a pear is subjected to the foregoing freeze conditioning treatment and is then restored approximately to room temperature, the epidermal layer may readily be removed mechanically, the epidermal layer automatically separating at a depth substantially equal to the freezing depth. The mechancal separation may take the form of a rubbing action, an abrading action, an expressing action, or the like.

I have found that the foregoing desirable results can be achieved only with a freeze conditioning treatment which involves exposing the pear to an ambient temperature of less than 0° F., and this is an important object of the invention. Higher conditioning temperatures do not produce acceptable results because the rate of cooling at temperatures above 0° F., is not rapid enough to cause the separation mechanism to take place. The mechanism by which the skin separates is probably a differential separation of cells due to a rapid freezing of cells close to the surface while cells below the surface remain unfrozen. This causes a shearing action in the cell boundary area.

Utilizing conditioning temperatures below 0° F. and conditioning times sufficient to produce the desired freezing depths, results, after restoration of the pear to room temperature, in disruption of one or more layers of cells in the hypodermal area of the pear and permits easy and clean mechanical removal of all of the epidermis, and most of the hypodermal cellular layers, from the cortex parenchyma, or main fleshly portion, of the pear. The hypodermal layer is defined as that area between the cortical parenchyma of the fleshly portion of the fruit and the epidermal layer. Such hypodermal layer encompasses the sclerieds, radiating palisade-like parenchyma, and other varying cell types found therein.

Various conditioning temperatures in the region below 0° F. may be used, the conditioning time decreasing as the ambient temperature to which the pear is exposed decreases.

As an example, one operative region is an area defined by the temperature limits of about —5° F. and about —35° F. with a maximum time limit of about 30 seconds throughout this temperature range and ranging downwardly to a minimum time limit of between 10 to 15 seconds at —35° F. This region covers pears of varying degrees of ripeness suitable for commercial canning operations. In general, an exposure time in excess of about 30 seconds in this region is undesirable since it tends to produce a mushy condition in the outer layer of the fleshy portion of the pear which I regard as unsatisfactory for high quality.

The invention may be practiced in the foregoing time-temperature region by utilizing brine as the freezing agent, the pears being immersed in brine within the temperature range outlined for the time range indicated.

Another operative region for the present invention is at a temperature of —320° F. within a time range of about 5 to 15 seconds, —320° F. being the temperature of liquid nitrogen. At this much lower temperature, the pear immersion time is, of course, less than in the sub-zero brine range discussed above, to achieve the same freezing depth.

It will be understood that if intermediate immersion temperatures are used, intermediate immersion times must also be used to achieve the desired freezing depth.

Referring to the accompanying drawing, I have found that the process of my invention is operative between the lines A–B–C–D–E and F–G–H–I–J. The space between these lines represents variations in peelability in accordance with the invention with variations in ripeness. If peeling a mixture of pears of different ripenesses, it is preferable to follow the line A–B–C–D–E.

The line G–B represents the hereinbefore-discussed maximum time limit which avoids mushiness in the outer layer of the fleshly portion of the pear. If maintenance of high quality is not absolutely essential, it is possible to go above the line G–B.

The area G–B–C–H–G represents the hereinbefore-discussed operative region using brine as the shock chilling agent.

The area G–B–C–D–I–H–G includes both the brine and liquid nitrogen regions mentioned. The dotted portions A–B, D–E, F–G and I–J of the curves represent extrapolations.

Although exemplary embodiments of the process of the invention have been disclosed herein for purposes of illustration, it will be understood that variations are possible without departing from the spirit of the invention as defined by the claims which follow:

1. A method of peeling a pear, comprising the steps of: exposing the pear to an ambient temperature less than 0° F. for a length of time only sufficient to permit mechanical separation of the epidermal layer of the pear from the cortex parenchyma of the pear within the hypodermal layer of the pear upon subsequent restoration of the temperature of the pear to approximately room temperature; restoring the temperature of the pear to approximately room temperature; and mechanically removing the epidermal layer of the pear.

2. A method of peeling a pear, comprising the steps of: exposing the pear to an ambient temperature less than 0° F. for a time sufficient to freeze the pear to a depth of the order of 0.01 inch; restoring the temperature of the pear to approximately room temperature; and removing the epidermal layer of the pear.

3. A method of peeling a pear, comprising the steps of: exposing the pear to an ambient temperature less than 0° F. for a time ranging between about 15 seconds and about 30 seconds at a temperature of the order of −25° F., or ranging between about 5 seconds and about 15 seconds at a temperature of the order of −320° F.; restoring the temperature of the pear to approximately room temperature; and removing the epidermal layer of the pear.

4. A method of peeling a pear, comprising the steps of: subjecting the pear to a time-temperature exposure substantially between the line A–B–C–D–E of the accompanying drawing and the line F–G–H–I–J thereof; restoring the temperature of the pear to approximately room temperature; and removing the epidermal layer of the pear.

5. A method of peeling a pear, comprising the steps of: subjecting the pear to a time-temperature exposure substantially within the area G–B–C–D–I–H–G of the accompanying drawing; restoring the temperature of the pear to approximately room temperature; and removing the epidermal layer of the pear.

6. A method of peeling a pear, comprising the steps of: subjecting the pear to a time-temperature exposure substantially within the area G–B–C–H–G of the accompanying drawing; restoring the temperature of the pear to approximately room temperature; and removing the epidermal layer of the pear.

7. A method of peeling a pear, including the steps of: exposing the pear to a temperature less than 0° F. for a time sufficient to freeze substantially only the epidermal layer of the pear; restoring the temperature of the pear to approximately room temperature; and mechanically removing the epidermal layer of the pear.

8. A method of peeling a pear, including the steps of: exposing the pear to a temperature less than 0° F. for a time sufficient to freeze substantially only the epidermal layer of the pear; restoring the temperature of the pear to approximately room temperature; and mechanically removing the epidermal layer of the pear by expression.

References Cited by the Examiner
UNITED STATES PATENTS 2,097,479  11/37  Taylor _____ 146—228
2,583,697  1/52   Hendry et al. _____ 146—228 X J. SPENCER OVERHOLSER, *Primary Examiner.*

CARL W. ROBINSON, *Examiner.*